United States Patent [19]

Jones

[11] 4,066,330

[45] Jan. 3, 1978

[54] COUPLER FOR JOINING OPTICAL DEVICES

[75] Inventor: Eric Mynard Jones, Los Angeles, Calif.

[73] Assignee: Karl Storz Endoscopy-America, Inc., Los Angeles, Calif.

[21] Appl. No.: 697,431

[22] Filed: June 14, 1976

[51] Int. Cl.² ............................ G02B 9/04; F16D 1/00
[52] U.S. Cl. ........................................ 350/80; 350/257; 285/308; 403/335; 403/322
[58] Field of Search .................... 350/80, 257, 61, 64, 350/67, 69; 403/335, 338, 322, 327; 285/308, 317, 314

[56] References Cited

U.S. PATENT DOCUMENTS 1,761,157   6/1930   Schellin ........................... 285/314
3,822,951   7/1974   Bornzin ........................... 403/322

FOREIGN PATENT DOCUMENTS 2,346,197   7/1975   Germany ........................... 350/257

*Primary Examiner*—Jon W. Henry
*Attorney, Agent, or Firm*—Donald D. Mon

[57] ABSTRACT

A coupler for joining optical devices. It receives a peripheral flange. The coupler includes a socket to receive the flange. Each of a plurality of radially movable retainer studs has a shoulder which can project through a respective aperture in the side wall of the socket to overhang and engage a shoulder on said flange, thereby to hold together optical devices that are in turn integral with or fastened to the flange and to the coupler. Means is provided for moving the retainer studs in the apertures, both into and out of the socket.

26 Claims, 4 Drawing Figures

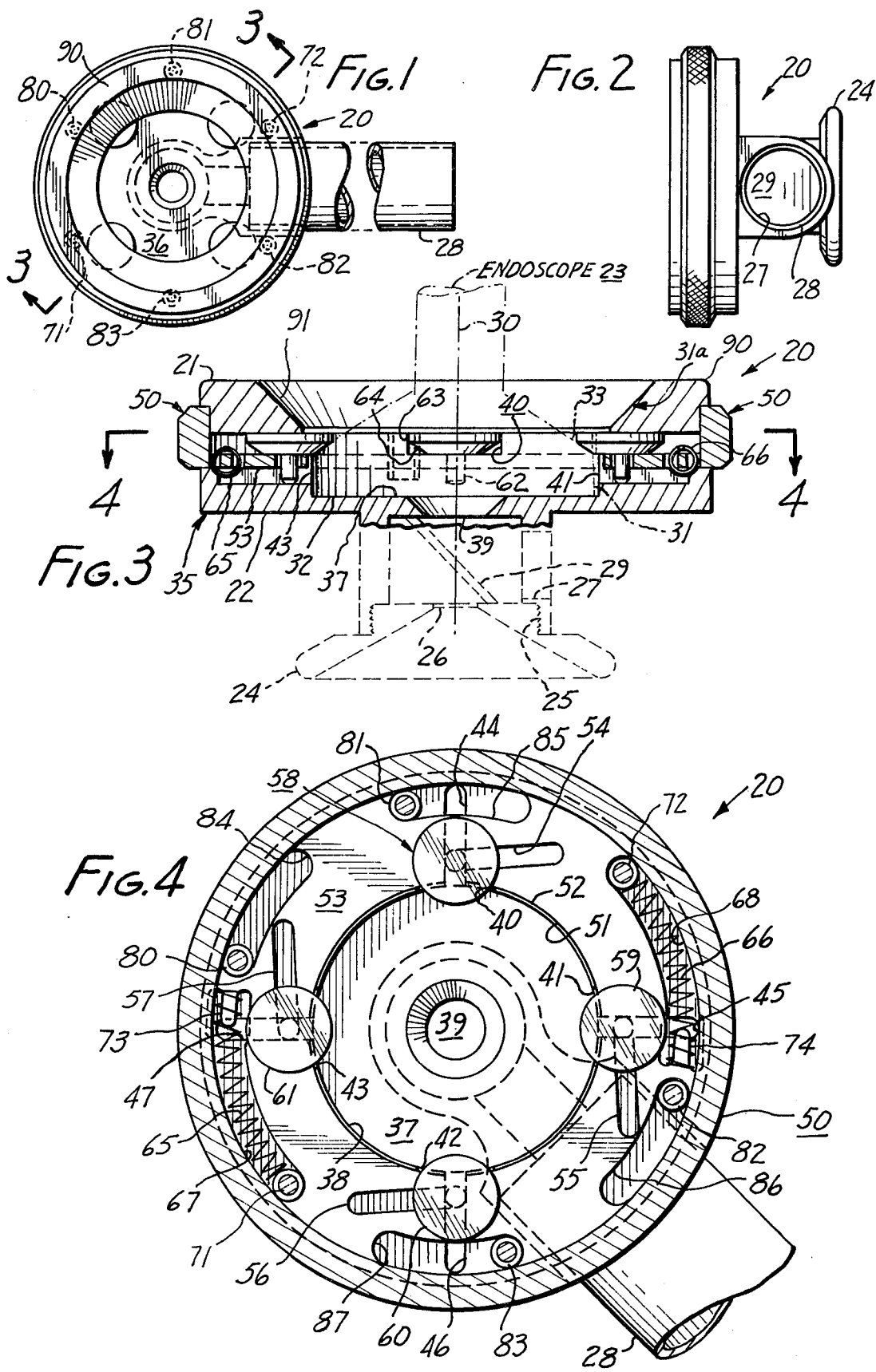

COUPLER FOR JOINING OPTICAL DEVICES

This invention relates to a coupler for joining optical devices.

It is desirable to couple and uncouple optical devices to and from one another in order to provide an optical system useful for some intended purpose, utilizing different combinations of optical devices. For example, an endoscope is an optical device used for examining internal cavities of the human body. In the course of its usage, the examining physician requires an eyepiece for his own use. Sometimes it is useful also to provide additional eyepieces for students or instructors simultaneously to observe, or a camera to record what is seen. In one exemplary usage of this invention, the endoscope would be provided with a flange to be engaged by the coupler, and a coupler would be attached to another optical device, such as an eyepiece, or a camera. There could be as many couplers as other optical devices. With the endoscope left in place, the other optical devices can readily be removed and replaced as desired. Obviously, an optimum coupler will enable optical devices simply and expeditiously to be changed, and will provide for automatic optical centering and alignment of the devices. It is also useful for the optical devices to be rotatable relative to one another around the optical axis. An endoscope, for example, has rotatable means which enables examination to be made completely around the periphery. The endoscope must be rotatable without requiring that the camera, for example, also be rotated.

It is an object of this invention to provide a coupler with all of the foregoing advantages. It is to be understood that an endoscope is merely one type of optical device which will benefit from this invention. The coupler of this invention is useful for other medical and surgical devices, as well as for other types of optical devices, for example microscopes.

Couplers for coupling optical devices are already known and in use. However, each known type has a serious deficiency which reduces its usefulness. For example, there are ball-detent couplers wherein ball bearings are pressed into a socket to hold the devices together. The sole constraint is that of holding the balls at their inward position. The coupling is released by pulling the parts away from one another to retract the balls. This causes wear on the parts. Also, jamming can occur because the balls can only be constrained against outward movement, and their position is not uniquely controllable in both the coupled and uncoupled condition.

Another known type of coupler utilizes intrusive fingers or grips which enter recesses in one of the parts. This arrangement holds the parts together quite securely but does not permit their relative rotation. Accordingly, a separate bearing assembly must be provided for this purpose. Furthermore, the fingers or grips may tend to cut into an eyepiece, which is undesirable.

Another known coupling type is a clamp, rather similar to a conventional hose clamp. These do not readily provide accurate centering and alignment of the optical devices. Relative rotation of the parts is difficult, and the knob used to tighten and loosen the clamp is located in a random position where it is not necessarily readily grasped by the user.

A coupler according to this invention is intended to engage a shoulder on a peripheral flange. The peripheral flange is carried by an optical device to be coupled to another optical device. The second optical device carries the coupler. The coupler includes a plurality of retainer studs, each of which includes a post. There is a shoulder on each post. A body of the coupler has an axis and a central socket. The socket is at least in part defined by a base disposed normal to the axis. The socket also has a side wall with a plurality of apertures therethrough. A plurality of substantially radially extending guide slots are fitted in the body, each of which is aligned with a respective aperture. One of the posts is slidably fitted into each of these guide slots.

An actuating ring is rotatably mounted to the body and includes a ramp slot respective to each of the guide slots. The ramp slots are disposed obliquely relative to the guide slots and to a plane that is normal to the guide slots. The ramp slots and guide slots overlay one another in pairs, with a respective post passing through each of said pairs. Rotation of the actuating ring moves the projected intersection of the slots radially inward or outward depending on the direction which the ring is turned. The post moves with the intersection, to a radial position respective to the angular position of the ring. When the posts are placed at their innermost radial location, their shoulders project through their respective apertures to overhang the shoulder on the flange, thereby to hold the optical devices together. An observation port passes through the base.

According to a preferred but optional feature of the invention, the shoulders on the posts are surfaces of revolution generated around the respective posts. This facilitates rotation at the coupler.

The above and other features of this invention will be fully understood from the following detailed description and the accompanying drawings in which:

FIG. 1 is a plan view of the presently preferred coupler according to the invention;

FIG. 2 is a right-hand side view of FIG. 1;

FIG. 3 is a cross-section taken on line 3—3 in FIG. 1; and;

FIG. 4 is a cross-section taken at line 4—4 in FIG. 3.

A coupler 20 according to the invention is shown in the drawings. It has an attachment end 21, on one side, and an observer end 22 on the opposite side. As can best be seen in FIGS. 1, 2 and 3, an optical device 23, for example an endoscope, is to be attached to the coupler. The coupler in turn can be carried by another optical device 24, for example an eyepiece or a camera. Device 24 may be formed integrally with the coupler, or may be attached thereto by any desired fastening means. It is of no importance to the coupler itself what are the optical devices, and the examples shown are merely some of many which can advantageously be used. For example, FIG. 3 shows a primary observation eyepiece 24, which might instead be a camera joined at thread 25 in place of the eyepiece.

A port 26 permits observation through the coupler. The eyepiece shown is intended for usage as a teaching attachment. A secondary observer can simultaneously see what is occurring. For this purpose a side port 27 is provided, to which tube 28, equipped with any desired optical system, is attached. A beam splitting cube, or first surface mirror 29 is placed in the path of the optical axis 30 from the endoscope.

The optical device 23 has mounting means 31a with a mounting flange 31 with a base 32 and a shoulder 33. It is by means of this mounting flange that the endoscope or other type of optical device and coupler will be joined together.

The coupler includes a body 35 having a socket 36 therein. The socket is at least partially defined by a base 37 disposed normal to axis 31, and by a sidewall 38. A port 39 opens through base 37 at the optical axis so that the image can be seen by the observers. The endoseope is standard in all details and will not be further described here. Suffice it to say that it is a surgical device for insertion into a cavity for examination of the cavity. Customarily, it is elongated and includes an objective lens system, often using fiberoptics, as a means to transmit the image from its probe end to the observer's end.

Body 35 includes four apertures 40, 41, 42, 43 which extend through the sidewall of the socket. An equal number of substantially radially-extending guide slots 44, 45, 46, 47 extend radially outward. An actuating ring 50 is mounted to the body. It includes an inner ring-shaped wall 51 that bears against an outer wall 52 on the base through which the apertures pass. The actuating ring includes a plate member 53 that slides atop the base. A plurality of ramp slots 54, 55, 56, 57 each respective to one of the guide slots 44, 45, 46, 47 are cut through the plate member. The ramp slots are disposed obliquely relative to the guide slots and also to a plane normal to the guide slots. The ramp slots and guide slots overlay each other in pairs. They are approximately the same width. Viewed in plan in FIG. 4, they have respective intersections whose distance from the central axis is a direct and unique function of the angular position of the actuating ring.

A plurality of retainer studs 58, 59, 60, 61 is provided, and they are all identical. Therefore only stud 58 will be described in detail. Each stud includes a post 62 which preferably is circular, and whose diameter is approximately equal to the width of the slots. It projects through the two slots so that their intersection bounds a region which restrains an uniquely positions the post. The angular position of the actuating ring thereby determines the axial position of the retainer studs.

Each stud includes a button-like cap, or head 63 with a shoulder 64 facing downwardly toward the base of the socket. The apertures are wide enough to pass at least a portion of the head so it can project into the socket for locking purposes. Bias springs 65, 66 are placed in respective arcuate ones of arcuate slots 67, 68. They receive bias springs 65, 66. One end of springs 65 and 66 respectively abuts a screw 71, 72 in the body. The other ends are in compressive contact with the ring, and are held by respective pins 73, 74 on the actuating ring. As a consequence, the actuating ring is biased toward the position which will tend to move the retainer studs toward the central axis.

It is preferable for the posts to be round, and for the shoulders 64 to be surfaces of revolution generated around the center of the respective post. It is also preferable for shoulders 33 and 64 to be matching surfaces of revolution, for example, frustums of cones, so a line contact, rather than a point contact, can be made between them. The post and shoulders 64 are therefore readily rotatable. With such an arrangement the unit loading on shoulder 33 is kept low, and rolling movement accompanies the rotation, rather than a frictional, scraping movement. This reduces wear on the parts, and makes the operation smoother and easier.

Limit pins 80, 81, 82, 83 are attached to the body and ride in limit slots 84, 85, 86, 87. These limit the angular movement of the plate when the ends of the limit slots strike the limit pins.

A cover plate 90 is attached to the body by limit pins 80–83, threaded through from the bottom. It has a sloping surface 91 which guides the endoscope toward the socket. The surface 91 will usually not be contiguous to the endoscope, because centering will ordinarily be accomplished by the retainer studs and sometimes but not usually by the sidewall of the socket. Forming the shoulders 33 and 64 frustoconically results in centering the devices, because of the unique position of the studs as a function of ring position. The base assures axial alignment.

It is a considerable advantage of this device that it is silent and smooth in operation. It causes no distraction, and requires little force for actuation. It must be remembered that changes of optical equipment may have to be made by a surgeon in the middle of a procedure. Smooth, easy, and quiet operation, preferably with one hand, is of considerable value to him. It is also an advantage to coat much of the device with a friction-reducing composition. A useful example of such a composition is polyfluoroethylene. At least the base surface of the socket and the overhanging shoulders of the posts should be coated with it. Preferably, all other surfaces which are sliding abutment may also be coated, even the bias springs, as well as the posts, the slot walls, and the abutting plates of the ring and the base. The outside of the ring may be knurled to assist the surgeon. Because unit load is reduced by the line contact, even aluminum eyepieces can be coupled with the coupler. The friction-reducing coating further reduces the wear.

At least three studs, and preferably four, will usually be provided, because this will provide adequate points of reference to center the device relative to the optical system. If a closer centering is desired, then the sidewall's dimensions may carefully be conformed to the anticipated sidewall dimensions of the mounting flange, and the sidewall can also be utilized to center the device. However, it will ordinarily be found that a relatively loose sidewise fit will be permissible, which gives greater tolerance in design of mechanisms, and facilitates their attachment. The bias spring force will be adequate to center the endoscope in the device while still holding it firmly in contact with the base for axial alignment. The friction-reducing coating will ease all movements so that all elements can readily slide relative to one another. Such a coating quiets the mechanism, especially of the springs, so that there is not a distracting noise emitted from the device, even when vibration might be induced from another source.

This invention thereby provides a coupler suitable to attach optical devices to one another. It can be actuated with only one finger, the surgeon merely moving the knurled ring with his finger against the relatively light spring bias. The devices are self-aligning and hold the optical devices quite tightly to the coupling. The angle selected for the ramp slots will preferably be less than the angle of sliding friction so that mere outward force on the stud will not cause rotation of the ring. Such an angle is a function of the properties of the material itself, and of the strength of the bias spring, and can readily be determined by the designer.

It is another advantage of this construction that the coupler is entirely open for drainage so it can readily be sterilized. By coating the visible surfaces black, relfections can be minimized. The friction-reducing material can be colored black, and be applied to the entire coupling, if desired.

This invention is not to be limited by the embodiment shown in the drawings and described in the description, which is given by way of example and not of limitation, but only in accordance with the scope of the appended claims.

I claim:

1. A coupler for joining optical devices, one of which carries a peripheral flange with a shoulder, said coupler comprising: a plurality of retainer studs, each retainer stud including a post and a shoulder on said post; a body having an axis, a socket at least in part defined by a base disposed normal to said axis, and a sidewall, a plurality of apertures through said sidewall, a plurality of substantially radially-extending guide slots, each aligned with a respective aperture, one of said posts being slidably fitted into each of said guide slots, and an observation port through the base; an actuating ring rotatably mounted to the body and including a plurality of ramp slots, one respective to each of said guide slots, each said ramp slot being disposed obliquely relative to its respective guide slot when viewed in plane and also obliquely to a plane normal to the guide slot, the ramp slots and guide slots overlaying one another in pairs with the respective posts passing through both of them at their projected intersection, rotation of the actuating ring moving the projected intersection of the slots radially inward or outward, depending on the direction in which the ring is turned, the posts moving correspondingly and, when the posts are at their innermost radial location, their shoulders project through respective apertures to overhang the shoulder carried by said one optical device to hold the optical devices together, and when the actuating ring is turned to move the posts radially outward, withdrawing the shoulders of the retainer studs so they clear the shoulder on the said one optical device.

2. A coupler according to claim 1 in which the retainer studs include a button-like cap, the shoulder being formed on said cap as a surface of revolution around the respective stud, and in which the retainer studs are freely rotatable in the said slots.

3. A coupler according to claim 2 in which the said surface of revolution is the frustum of a cone.

4. A coupler according to claim 1 in which spring bias means biases the actuating ring toward its position wherein the posts are moved toward the axis.

5. A coupler according to claim 4 in which the spring bias means comprises a coil spring disposed between the body and the actuating ring.

6. A coupler according to claim 1 in which a ring-shaped cover overlays the actuating ring and is connected to the body to trap the actuating ring between them.

7. A coupler according to claim 6 in which the cover includes a tapered wall to guide the peripheral flange into the socket.

8. A coupler according to claim 1 in which attachment means is provided on the body in alignment with the axis to join observation means thereto.

9. A coupler according to claim 1 in which reflective means is disposed on said axis to reflect at least some of the light from the observation port laterally of the axis, and in which attachment means is provided on the body in the path of the reflected light to join observation means thereto.

10. A coupler according to claim 9 in which attachment means in provided on the body in alignment with the axis to join observation means thereto.

11. A coupler according to claim 3 in which spring bias means biases the actuating ring toward its position wherein the posts are moved toward the axis.

12. A coupler according to claim 11 in which the spring bias means comprises a coil spring disposed between the body and the actuating ring.

13. A coupler according to claim 3 in which a ring-shaped cover overlays the actuating ring and is connected to the body to trap the actuating ring between them.

14. A coupler according to claim 13 in which the cover includes a tapered wall to guide the peripheral flange into the socket.

15. A coupler according to claim 3 in which the surfaces of revolution are coated with a friction-reducing material.

16. A coupler according to claim 15 in which the said material is polyfluoroethylene.

17. In combination: A coupler according to claim; and mounting means comprising a peripheral flange, a peripheral shoulder, and a face, said face being adapted to bear against the base to align the optical devices, and said shoulders being adapted to overhang and engage each other to hold the coupler and mounting means together.

18. A combination according to claim 17 in which the retainer studs include a button-like cap, the shoulder being formed on said cap as a surface of revolution around the respective stud, and in which the retainer studs thereby being freely rotatable in the said slots.

19. A combination according to claim 18 in which said surface of revolution is the frustum of a cone.

20. A combination according to claim 18 in which spring bias means biases the actuating ring toward its position wherein the posts are moved toward the axis.

21. A combination according to claim 20 in which the spring bias means comprises a coil spring disposed between the body and the actuating ring.

22. A coupler according to claim 1 in which there are included at least three of said retainer studs.

23. A coupler according to claim 2 in which there are included at least three of said retainer studs.

24. A coupler according to claim 3 in which there are included at least three of said retainer studs.

25. A coupler according to claim 24 in which a ring-shaped cover overlays the actuating ring and is connected to the body to trap the actuating ring between them.

26. A coupler according to claim 25 in which spring bias means biases the actuating ring toward its position wherein the posts are moved toward the axis.

* * * * *